United States Patent
Bull et al.

(10) Patent No.: US 11,255,475 B2
(45) Date of Patent: Feb. 22, 2022

(54) HIGH PRESSURE REMOTE CONNECTOR WITH SELF-ALIGNING GEOMETRY

(71) Applicant: HALLIBURTON ENERGY SERVICES, INC., Houston, TX (US)

(72) Inventors: Brad R. Bull, Duncan, OK (US); William D. Kendrick, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 364 days.

(21) Appl. No.: 16/115,363

(22) Filed: Aug. 28, 2018

(65) Prior Publication Data

US 2018/0372254 A1    Dec. 27, 2018

Related U.S. Application Data

(62) Division of application No. 14/023,610, filed on Sep. 11, 2013, now Pat. No. 10,094,501.

(51) Int. Cl.
    *F16L 37/12*     (2006.01)
    *E21B 33/038*    (2006.01)
    *F16L 37/138*    (2006.01)

(52) U.S. Cl.
    CPC .......... *F16L 37/122* (2013.01); *E21B 33/038* (2013.01); *F16L 37/121* (2013.01); *F16L 37/138* (2013.01); *Y10T 29/4987* (2015.01)

(58) Field of Classification Search
    CPC ..... F16L 37/122; F16L 37/121; F16L 37/138; E21B 33/038
    See application file for complete search history.

(56) References Cited

U.S. PATENT DOCUMENTS

| 3,071,188 A | 1/1963 | Raulins |
| 3,239,248 A | 3/1966 | Jones |

(Continued)

FOREIGN PATENT DOCUMENTS

| WO | WO-03048512 A1 * | 6/2003 | ........... F16L 37/121 |
| WO | WO-2012123087 A2 * | 9/2012 | ........... E21B 33/038 |

OTHER PUBLICATIONS

International Application Serial No. PCT/US2014/048024, International Preliminary Report on Patentability dated Mar. 24, 2016.

(Continued)

*Primary Examiner* — James M Hewitt, II
(74) *Attorney, Agent, or Firm* — Locke Lord LLP

(57) ABSTRACT

A connector can include multiple circumferentially distributed engagement structures which clamp two hubs together, and a biasing device which biases the engagement structures toward an open configuration thereof, in which the hubs are separable from each other. Another connector can include multiple circumferentially distributed engagement structures, each having a recess which receives hubs therein, and a sleeve which encircles the engagement structures and prevents the engagement structures from displacing radially outward from an open configuration thereof, in which the hubs are separable from each other. A method of making a connection to a wellhead can include applying pressure to a connector, thereby allowing multiple circumferentially distributed engagement structures to displace outward to an open configuration thereof, and displacing one hub of the connector into contact with another hub secured to the wellhead, the engagement structures axially aligning the hubs during the displacing.

6 Claims, 3 Drawing Sheets

(56) References Cited

U.S. PATENT DOCUMENTS

| | | | |
|---|---|---|---|
| 4,337,971 A | 7/1982 | Kendrick | |
| 4,433,859 A | 2/1984 | Driver et al. | |
| 4,451,056 A | 5/1984 | Galle, Jr. | |
| 4,496,172 A | 1/1985 | Walker | |
| 4,516,795 A | 5/1985 | Baugh | |
| 4,647,254 A * | 3/1987 | Baugh | F16L 37/002 405/169 |
| 4,648,629 A | 3/1987 | Baugh | |
| 4,693,497 A | 9/1987 | Pettus et al. | |
| 4,708,376 A | 11/1987 | Jennings et al. | |
| 5,526,888 A | 6/1996 | Gazewood | |
| 6,035,938 A | 3/2000 | Watkins | |
| 6,098,715 A | 8/2000 | Seixas et al. | |
| 6,595,293 B2 | 7/2003 | Carter | |
| 8,016,042 B2 | 9/2011 | Spiering et al. | |
| 2001/0045286 A1 | 11/2001 | Pallini et al. | |
| 2004/0245779 A1 | 12/2004 | Russell | |
| 2005/0146137 A1 | 7/2005 | Davidson et al. | |
| 2011/0079399 A1 | 4/2011 | Nguyen et al. | |
| 2012/0222865 A1 | 9/2012 | Larson et al. | |
| 2013/0174928 A1 | 7/2013 | Danielson | |
| 2013/0199801 A1 | 8/2013 | Johnson et al. | |
| 2014/0170884 A1 | 6/2014 | Mogeda et al. | |
| 2014/0210203 A1 | 7/2014 | Lorkowsi | |
| 2014/0318809 A1 | 10/2014 | Joensen et al. | |

OTHER PUBLICATIONS

International Application Serial No. PCT/US2014/048024, Written Opinion dated Mar. 24, 16.

International Application Serial No. PCT/US2014/048024, International Search Report dated Nov. 24, 2014.

Halliburton Energy Services Drawing No. 425.8042, Clamp, Remote Disconnect, 4 IN. Big Inch, 15000 PSI WP, 22500 PSI Test, Oct. 8, 2013, 1 page.

FMC Technologies, Inc. "Flowline Products and Services: World Proven Chiksan and Weco Equipment", product catalog, 2012, 15 pages.

* cited by examiner

HIGH PRESSURE REMOTE CONNECTOR WITH SELF-ALIGNING GEOMETRY

CROSS REFERENCE TO RELATED APPLICATIONS

This application is a divisional of U.S. Non-Provisional Application Ser. No. 14/023,610, entitled "High Pressure Remote Connector with Self-aligning Geometry," filed Sep. 11, 2013, which is incorporated herein by reference in its entirety.

TECHNICAL FIELD OF THE DISCLOSURE

This disclosure relates generally to equipment utilized and operations performed in conjunction with a subterranean well and, in an example described below, more particularly provides a high pressure remote connector with self-aligning geometry.

BACKGROUND

It is frequently desired to make a pressure bearing connection between components at a well. However, such components are many times large, heavy, manipulated by imprecise positioning equipment and/or located in relatively inaccessible or hazardous locations. Such conditions can make it difficult to accurately align the components, so that the connection can conveniently be made without damaging any elements (such as seals) of the connection.

Therefore, it will be readily appreciated that improvements are continually needed in the art of constructing and utilizing connectors for use in conjunction with wells. Such improvements may be useful whether or not components of a connector are large, heavy, manipulated by imprecise positioning equipment and/or located relatively inaccessible or hazardous locations.

DETAILED DESCRIPTION

Figure 1:
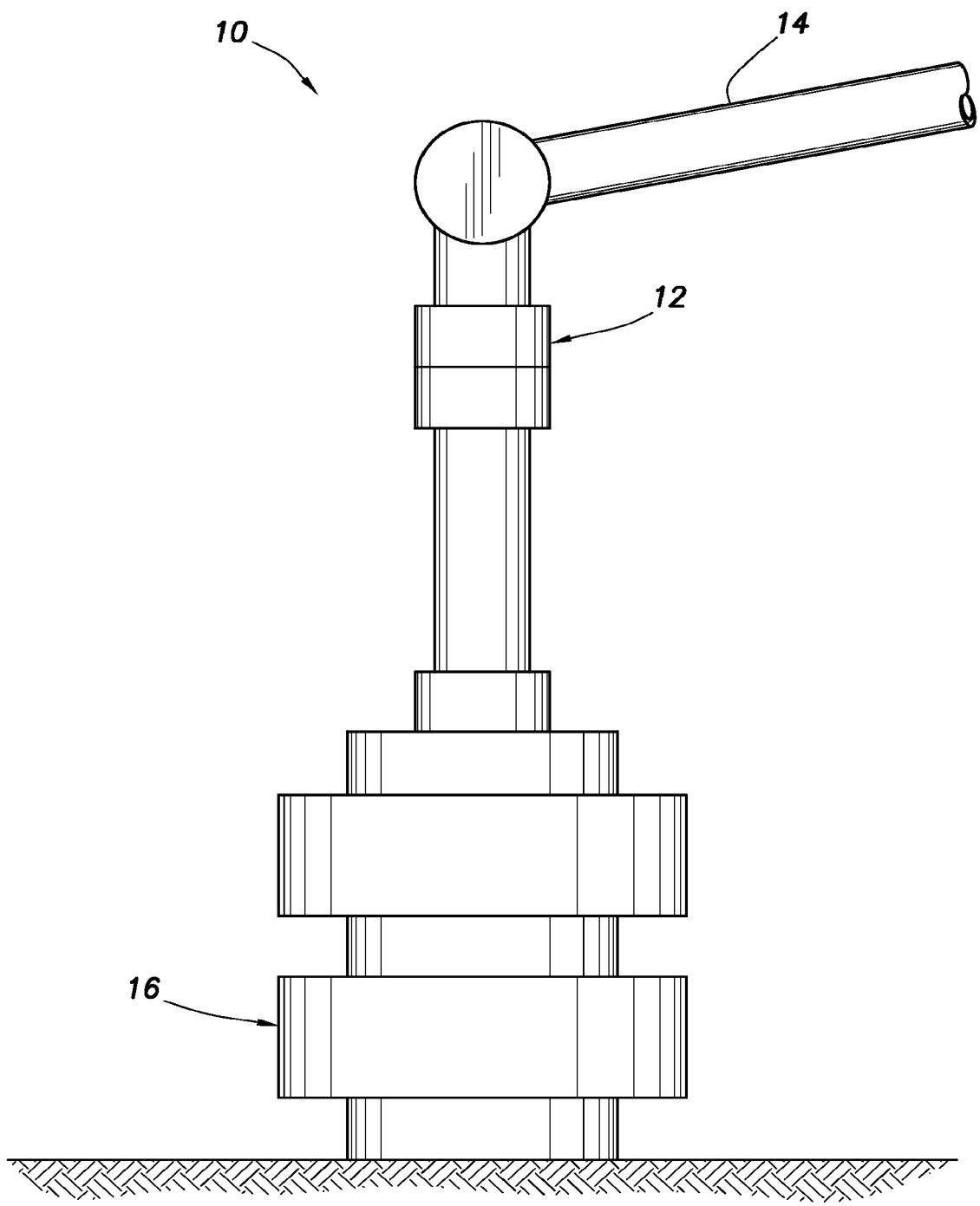
FIG. 1 is a representative partially cross-sectional view of a well system and associated method which can embody principles of this disclosure.

Representatively illustrated in FIG. 1 is a well system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a connector 12 is used to connect a line 14 to a wellhead 16. The wellhead 16 is on land but, in other examples, the connector 12 could be used to connect to an underwater wellhead, to connect to another line connected to a wellhead on land or underwater, to connect to a rig on land or water, etc. Therefore, the scope of this disclosure is not limited to any particular wellhead location, or to any particular use for the connector 12.

In the FIG. 1 example, the line 14 is used to deliver fluids at high pressures and flow rates to the wellhead 16 in a stimulation operation. The connector 12 is specially configured to withstand such high pressures, and to enable rapid and convenient connection of the line 14 to the wellhead 16 without damage to any components of the connector. However, the scope of this disclosure is not limited to use of the connector 12 in a stimulation operation, or in any other particular well operation, or to only relatively high pressure operations.

Figure 2:
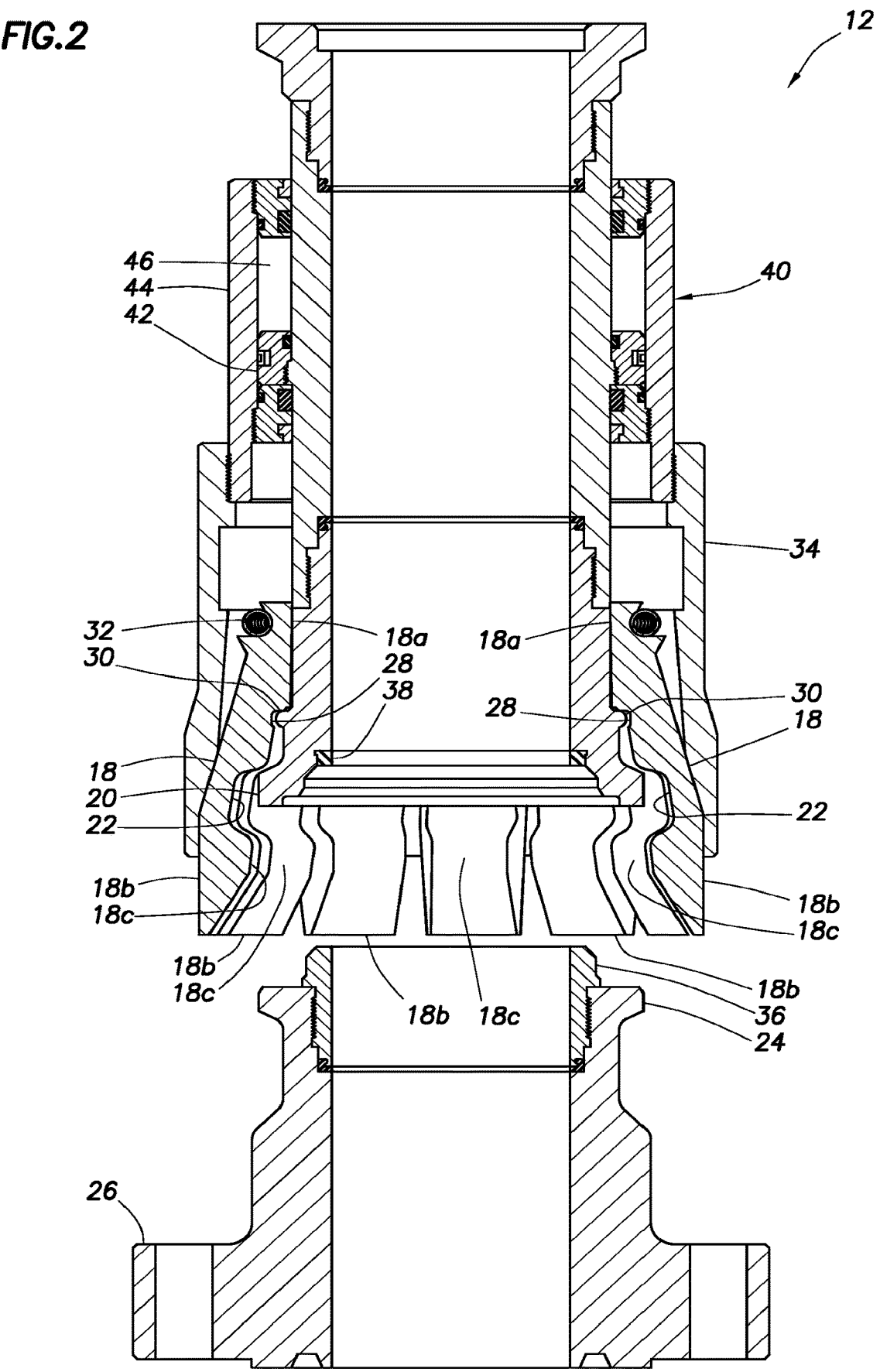
FIG. 2 is a representative cross-sectional view of a connector which may be used in the system and method of FIG. 1, and which can embody the principles of this disclosure, the connector being depicted in an open configuration.

Referring additionally now to FIG. 2, an enlarged scale cross-sectional view of the connector 12 is representatively illustrated. The connector 12 may be used in the well system 10 of FIG. 1, or it may be used in other well systems, in keeping with the principles of this disclosure.

In the FIG. 2 view, it may be seen that the connector 12 includes multiple engagement structures 18 circumferentially spaced apart and distributed about a radially enlarged hub 20. Each of the structures 18 includes a recess 22 formed therein for receiving the hub 20 and another hub 24, whereby the hubs can be clamped together. The hub 24 can, for example, be secured to the wellhead 16 (see FIG. 1) with a flange 26.

The structures 18 are pivotably mounted to the hub 20, for example, with recesses 28 in the structures 18 being engaged with a ring 30. In other examples, the structures 18 could be pivotably mounted using pivot pins or other devices.

An upper end 18a of each structure 18 is biased radially inward by a biasing device 32. In the open configuration depicted in FIG. 2, a biasing force exerted by the biasing device 32 has displaced the upper ends 18a of the structures 18 inward, so that lower ends 18b of the structures are outwardly displaced. This allows the hubs 20, 24 to be separated from each other, or to be axially aligned and engaged with each other, as described more fully below.

The biasing device 32 depicted in FIG. 2 is a single continuous coiled extension spring (also known as a "garter" spring), which extends about the upper ends 18a of the structures 18. In other examples, the biasing device 32 could be other types of devices (such as, an elastomer, leaf springs, etc.) capable of exerting a biasing force, or multiple biasing devices could be used, etc. Thus, the scope of this disclosure is not limited to any particular details of the connector 12 as depicted in the drawings or described herein.

In the FIG. 2 example, the structures 18 are surrounded by a sleeve 34. The sleeve 34 is used to pivot the structures 18 between their open and closed configurations.

The sleeve 34 also prevents outward displacement of the structures 18 from their open configuration, so that the lower ends 18b of the structures can be used to axially align the hubs 20, 24 with each other when they are displaced into engagement. In FIG. 2, note that the lower ends 18b of the structures 18 are generally funnel-shaped and have an inner surface 18c that will approximately laterally center the hub 24 with the hub 20 as they are displaced toward each other.

This coarse axial alignment helps to guide a seal insert 36 in the hub 24 into engagement with a seal 38 in the hub 20. The seal insert 36 can be received in the hub 20 without damage (e.g., which damage might otherwise be caused by the seal insert improperly striking another component) and more precisely axially align the hubs 20, 24, due to the coarse axial alignment of the hubs 20, 24 provided by the structures 18 being maintained in their open configuration by the sleeve 34.

The sleeve 34 is displaced by an actuator 40 of the connector 12. The actuator 40 includes a piston 42 connected to the hub 20, and a cylinder 44 connected to the sleeve 34, so that the sleeve can be displaced relative to the hub 20 and structures 18.

In the open configuration of FIG. 2, an increased pressure has been applied to an upper chamber 46 of the actuator 40, thereby producing a pressure differential across the piston 42 and displacing the cylinder 44 and sleeve 34 upward (as viewed in the figure). To displace the structures 18 to a closed configuration thereof, an increased pressure can be applied to a lower chamber 48 (see FIG. 3) of the actuator 40, thereby producing an oppositely directed pressure differential across the piston 42 and displacing the cylinder 44 and sleeve 34 downward (as viewed in the figure).

Figure 3:
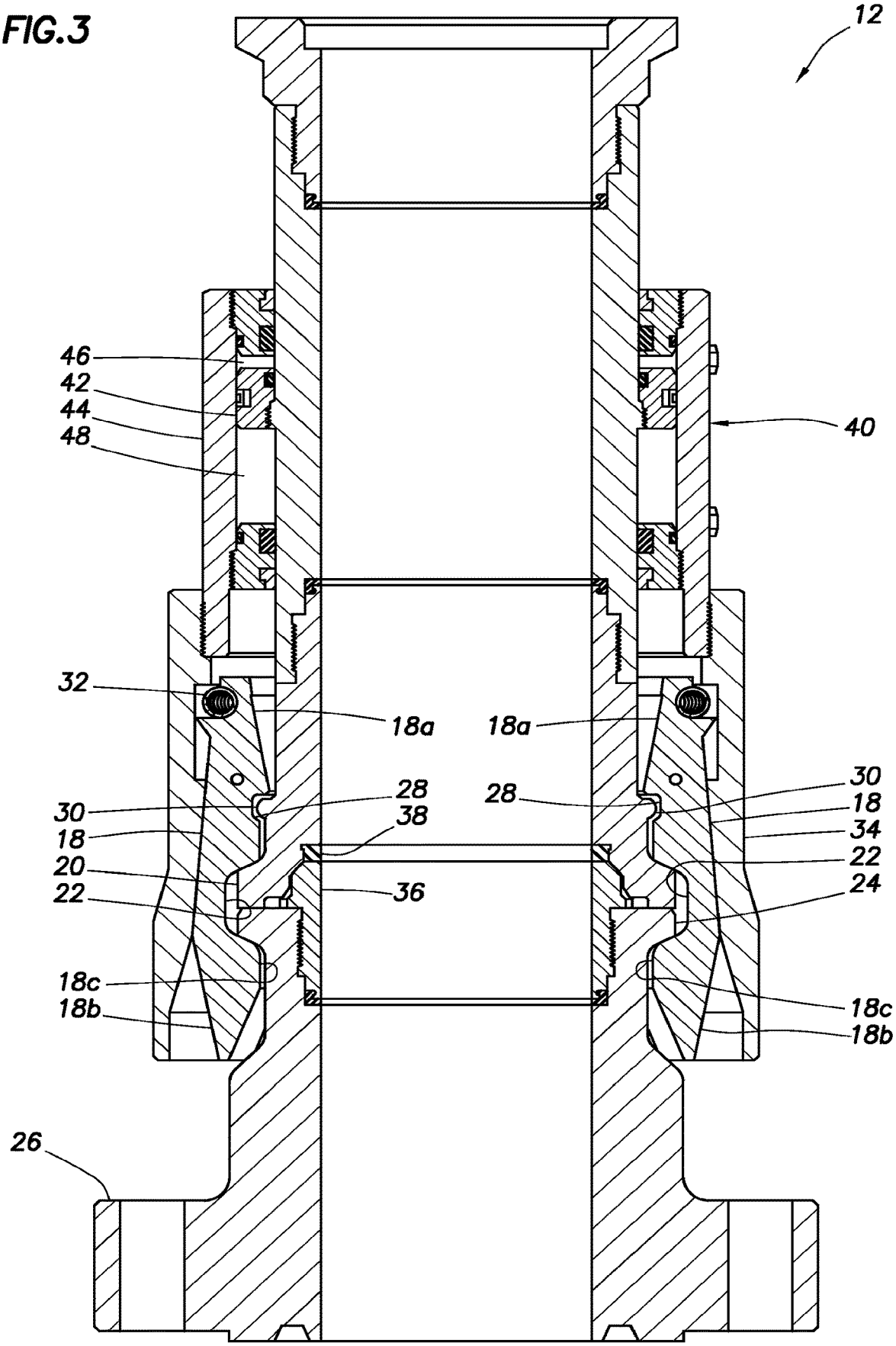
FIG. 3 is a representative cross-sectional view of the connector, the connector being depicted in a closed configuration.

Referring additionally now to FIG. 3, the connector 12 is representatively illustrated with the hubs 20, 24 engaged and clamped to each other, so that the connector is able to contain pressure, with the structures 18 having been displaced to their closed configuration by downward displacement of the sleeve 34. In this closed configuration, the seal 38 can prevent leakage of relatively high pressure fluid in the connector 12.

Note that, when the sleeve 34 is displaced downward by the actuator 40, the structures 18 are caused to pivot relative to the hub 20, with the upper ends 18a displacing outward and the lower ends 18b displacing inward. This inward displacement of the lower ends 18b causes the hubs 20, 24 to be received in the recesses 22 and clamped together, thereby preventing separation of the hubs. The hubs 20, 24 and recesses 22 are provided with inclined surfaces, so that engagement between these surfaces acts to urge the hubs toward each other as the recesses pivot inwardly.

It may now be fully appreciated that the above disclosure provides significant advancements to the art of constructing and utilizing connectors for use with subterranean wells. In examples described above, the line 14 (see FIG. 1) can be reliably, rapidly and conveniently connected to the wellhead 16 (or to other well equipment) using the connector 12.

The above disclosure provides to the art a connector 12 for use with a subterranean well. In one example, the connector 12 can comprise multiple circumferentially distributed engagement structures 18 which clamp together first and second radially enlarged hubs 20, 24, and a biasing device 32 which biases the engagement structures 18 toward an open configuration thereof, in which the second hub 24 is separable from the first hub 20.

The connector 12 can also include a sleeve 34 which encircles the engagement structures 18 and prevents the engagement structures 18 from displacing radially outward from the open configuration.

The connector 12 can also include an actuator 40 which, in response to a first pressure differential applied across a piston 42 of the actuator 40, displaces the sleeve 34 to an open position in which the biasing device 32 displaces the engagement structures 18 to the open configuration. The actuator 40, in response to a second pressure differential applied across the piston 42, may displace the sleeve 34 to a closed position in which the sleeve 34 biases the engagement structures 18 into clamping engagement with the first and second hubs 20, 24.

The engagement structures 18 can be pivotably mounted relative to the first hub 20 between first and second ends 18a,b of the engagement structures 18. The biasing device 32 may inwardly bias the first ends 18a of the engagement structures 18. The second ends 18b of the engagement structures 18 may be displaced outward by a biasing force exerted by the biasing device 32.

The engagement between the second hub 24 and the engagement structures 18 in the open configuration can align the first and second hubs 20, 24.

Also described above is a connector 12 for use with a subterranean well, the connector 12 in one example including multiple circumferentially distributed engagement structures 18, each having a recess 22 which receives therein first and second radially enlarged hubs 20, 24, and a sleeve 34 which encircles the engagement structures 18 and prevents the engagement structures 18 from displacing radially outward from an open configuration thereof, in which the second hub 24 is separable from the first hub 20.

A method of making a connection to a wellhead 16 is also described above. In one example, the method can comprise: applying pressure to a connector 12, thereby allowing multiple circumferentially distributed engagement structures 18 of the connector 12 to displace outward to an open configuration thereof; and displacing a first hub 20 of the connector 12 into contact with a second hub 24 secured to the wellhead 16, the engagement structures 18 axially aligning the second hub 24 with the first hub 20 during the displacing step.

The pressure applying step can include displacing a sleeve 34 of the connector 12 to an open position thereof, the sleeve 34 in the open position preventing outward displacement of the engagement structures 18 from the open configuration. The pressure applying step can also include applying a first pressure differential across a piston 42 of an actuator 40, thereby displacing the sleeve 34 to the open position. The method can include applying a second pressure differential across the piston 42, thereby displacing the sleeve 34 to a closed position in which the sleeve 34 biases the engagement structures 18 into clamping engagement with the first and second hubs 20, 24.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of making a connection to a wellhead, the method comprising:

applying increased pressure to an upper chamber of an actuator and producing a pressure differential across a piston;

displacing a cylinder and a sleeve upward such that pressure is applied to a connector, thereby allowing multiple circumferentially distributed engagement structures of the connector to displace outward to an open configuration thereof, wherein the displacing of the sleeve of the connector to the open position prevents outward displacement of the engagement structures from the open configuration; and displacing a first hub of the connector into contact with a second hub secured to the wellhead, the engagement structures axially aligning the second hub with the first hub during the displacing.

2. The method of claim 1, wherein the engagement structures are pivotably mounted relative to the first hub between first and second ends of the engagement structures.

3. The method of claim 1, wherein a biasing device biases the engagement structures toward the open configuration.

4. The method of claim 3, wherein the biasing device inwardly biases ends of the engagement structures.

5. The method of claim 4, wherein opposite ends of the engagement structures are displaced outward by a biasing force exerted by the biasing device.

6. A method of making a connection to a wellhead, the method comprising:

applying increased pressure to an upper chamber of an actuator and producing a pressure differential across a piston;

displacing a cylinder and a sleeve upward such that pressure is applied to a connector, thereby allowing multiple circumferentially distributed engagement structures of the connector to displace outward to an open configuration thereof;

displacing a first hub of the connector into contact with a second hub secured to the wellhead, the engagement structures axially aligning the second hub with the first hub during the displacing; and further comprising applying a second pressure differential across the piston, thereby displacing the sleeve to a closed position in which the sleeve biases the engagement structures into clamping engagement with the first and second hubs.

\* \* \* \* \*